June 6, 1939.　　　T. N. PIERSON　　　2,161,634
GRAIN PAN FOR HARVESTING MACHINES
Filed Aug. 19, 1937　　　3 Sheets-Sheet 3
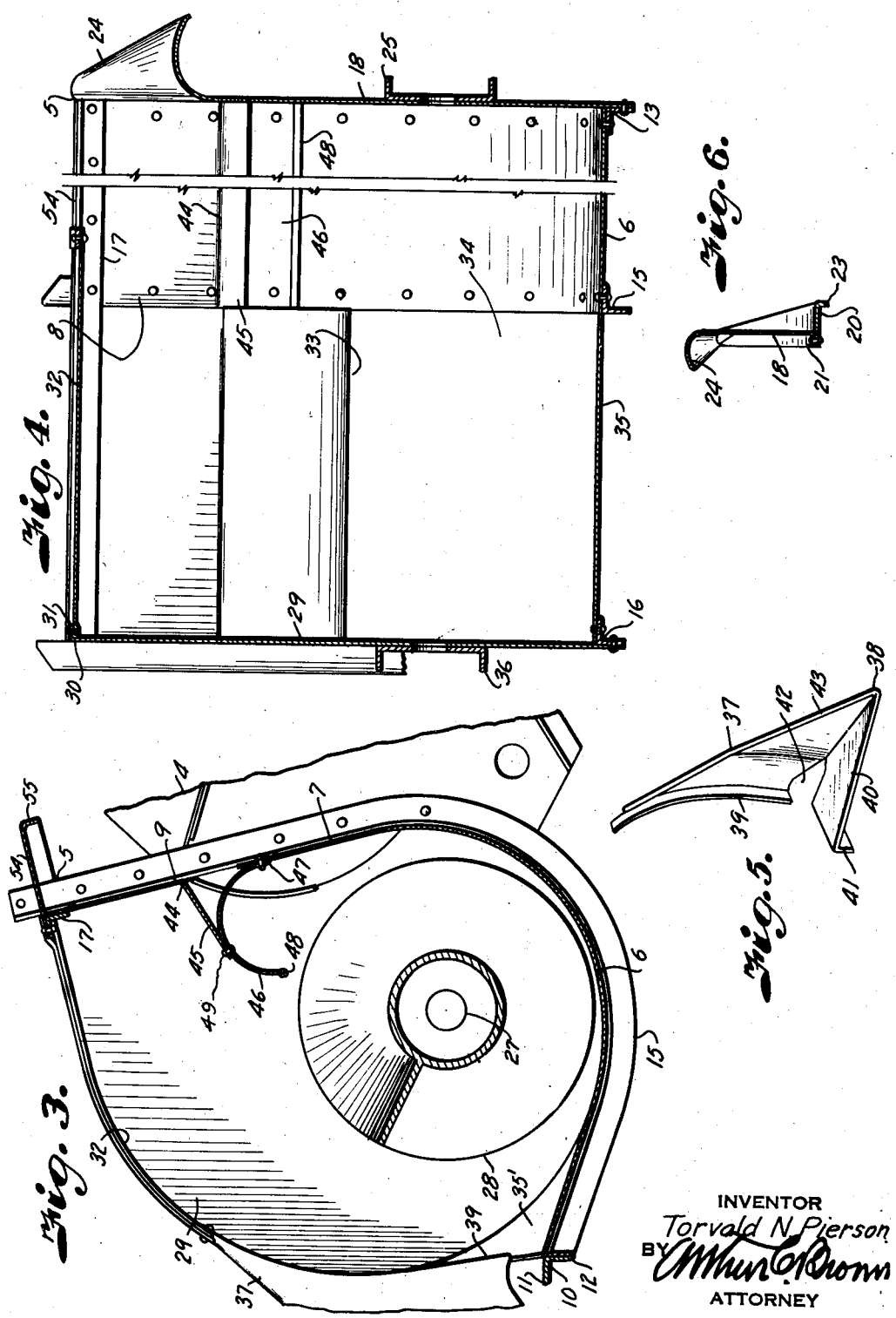
INVENTOR
Torvald N. Pierson
BY
ATTORNEY Patented June 6, 1939

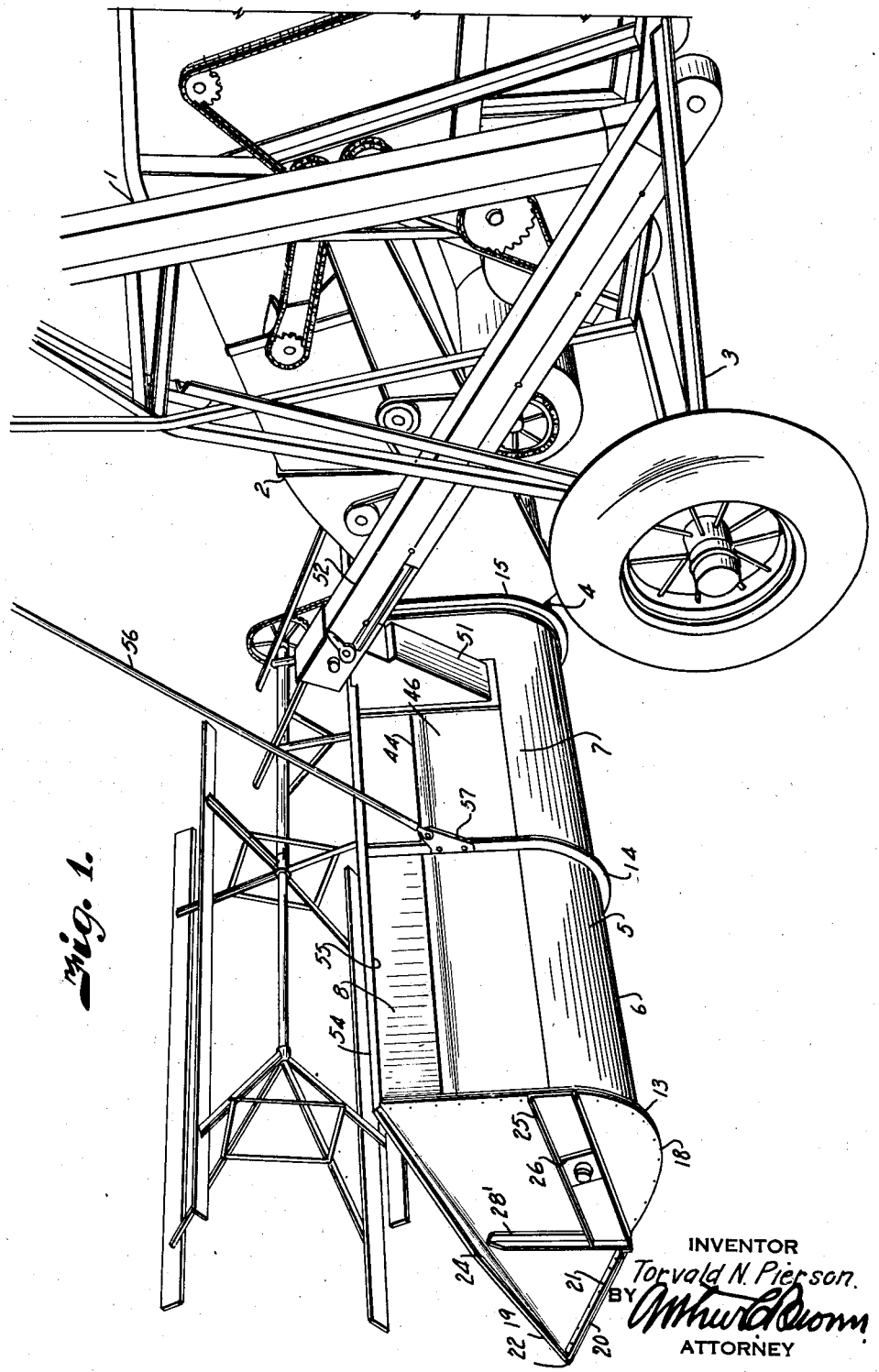

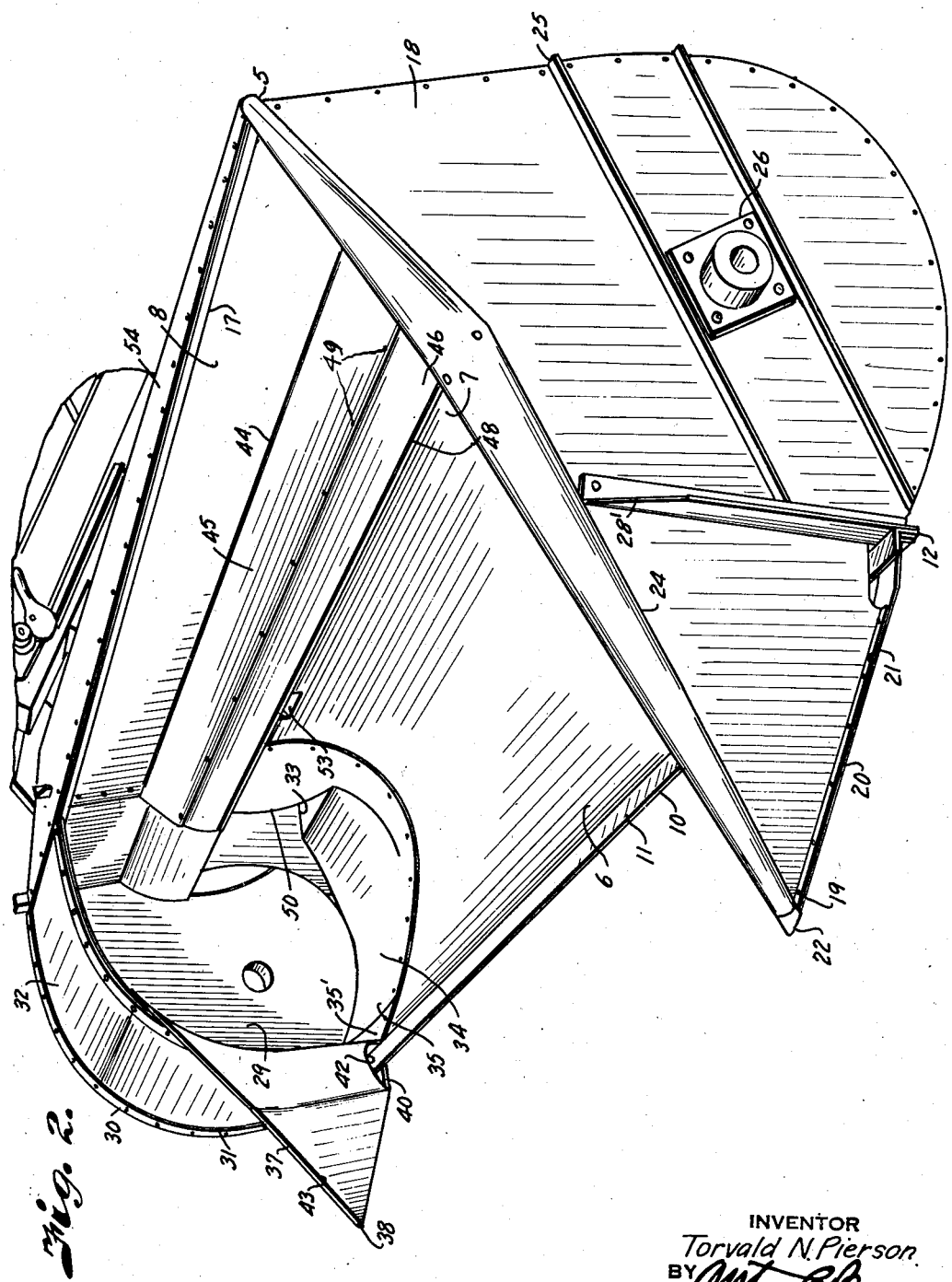

2,161,634

UNITED STATES PATENT OFFICE 2,161,634

GRAIN PAN FOR HARVESTING MACHINES

Torvald N. Pierson, Independence, Mo., assignor to Gleaner Harvester Corporation, Independence, Mo., a corporation of Delaware Application August 19, 1937, Serial No. 159,921

7 Claims. (Cl. 56—153)

This invention relates to harvesting machines, and particularly to a grain pan for machines of this character wherein the material harvested is collected and delivered by a conveyor to the threshing unit.

The principal object of the present invention is to provide a grain pan of strong, light weight construction, suitable for small combine harvesters wherein light weight is an important factor to the successful operation of the machines.

Other important objects of the invention are to provide a grain pan that is resistant to torsional strains; and to provide a grain pan equipped with means for guiding the cut grain or the like in cooperative relation with the conveyor and which is formed as an integral part of the pan to enhance the rigidity thereof.

In accomplishing these and other objects of the invention, as hereinafter pointed out, I have provided improved details of structure, the preferred form of which is illustrated in the accompanying drawings, wherein:

Fig. 1 is a perspective view of a portion of a combine harvester, equipped with a grain pan embodying the features of the present invention.

Fig. 2 is an enlarged perspective view of the grain pan as viewed from the front thereof.

Fig. 3 is a cross-section through the pan.

Fig. 4 is a longitudinal section through the ends of the pan.

Fig. 5 is a detail perspective view of the grain guide wing at the delivery end of the pan.

Fig. 6 is a detail section through the grain divider.

Referring more in detail to the drawings:

1 designates a combined harvester, separator and thresher, including a threshing and separating unit designated by the housing 2, which is supported upon the mobile frame 3 as in conventional practice. Suspended laterally from the forward end of the housing 2 is a harvesting unit 4, including a grain pan 5 embodying the features of the present invention.

The pan 5 has a substantially semicylindrical sheet metal bottom section 6, terminating along the rear edge thereof in an upwardly extending wall 7 which cooperates with an upper section 8 to form a wind board 9. Fixed to the forward edge of the pan is an angle bar 10, having one flange 11 extending forwardly to provide an attachment for the sickle (as shown). Fixed to the other flange 12 of the angle bar are angle bars 13, 14, 15 and 16, shaped to conform to the curvature of the pan and which are secured thereto at spaced points along the width thereof.

The angle bars 13, 14, 15 and 16 extend upwardly at the rear of the bottom 6, and are connected at their upper ends by an angle bar 17 extending the length of the pan. The outer end of the pan is closed by an end wall 18 secured to the flange of the angle bar 13. The wall 18 extends forwardly of the pan to provide a grain divider 19, the lower edge of which is reinforced by an angle plate 20 that is fixed to a lateral flange 21 of the divider. The angle plate 20 is relatively wide at its rear end, which attaches to the forwardly extending flange 11 of the bar 10, and tapers toward the nose 22 of the divider, as best shown in Fig. 6. The inner edge of the plate is flanged downwardly, as at 23, to stiffen the divider. The upper edge of the end wall is rolled outwardly from the nose 22 of the divider to the upper edge of the wind board, as shown at 24 in Figs. 2, 4 and 6. The roll 24 preferably tapers from the ends thereof toward the center of the pan to enhance the stiffening effect thereof and provide a rigid end wall. The end wall is further stiffened by a channel plate 25 that is secured thereto, and which carries a bearing 26 for journaling the shaft 27 of a screw conveyor 28. The end wall is further braced by an angle bar 28', that connects the end of the sickle attaching bar 10, and is secured to the outer face of the end wall at the end of the channel plate 25, the angle bar preferably extending to approximately the rolled edge of the wall, as best shown in Fig. 2.

The opposite end of the grain pan is closed by an end wall 29, conforming to the shape of the angle bar 16 and having its edge formed on an arc 30 which extends from the angle bar 10 to the upper edge of the wind board. Secured to the arcuate edge of the end wall, by a suitable lock seam 31, is a cover plate 32, extending over the outlet opening 33 leading to the threshing cylinder (not shown). The cover plate 32 cooperates with the end wall and the bottom of the pan to form a feed chamber 34 wherein the material moved by the conveyor is diverted through the opening 33. The bottom of the feed chamber is preferably formed of a sheet 35, separate from the bottom of the pan, and is shaped to conform to the opening 33, the inner edge of the sheet 35 being riveted or otherwise secured to the sheet forming the bottom of the pan, and the forward edge has an inclined or ramp portion 35' over which the material is guided to prevent its catching in the juncture between the cover 32 and bottom sheet 35.

The outer face of the end wall 29 is provided with a channel plate 36, cooperating with the channel 25 to carry a suitable bearing for mounting that end of the conveyor shaft. Fixed to the inner edge of the cover plate 32 is a divider wing 37, of substantially triangular shape to provide a nose 38, similar to that of the grain divider. The rear edge of the divider wing carries an arcuate flange 39 that is secured to the inner edge of the cover plate 32. Also formed as a part of the plate 37, and extending along the lower edge thereof, is a substantially triangular-shaped flange 40 terminating in an attaching flange 41 that is secured to the angle bar 10. The divider wing is provided with a suitable opening 42, through which the sickle bar is adapted to operate. The upper edge of the wing terminates in a roll 43 to further stiffen the wing and provide a more finished appearance.

The upper section 8 of the wind board is spaced from the terminal edge of the section 7, and is flanged inwardly, as at 44, to provide a downwardly and forwardly extending flange or wing 45, terminating over the conveyor to cooperate with the terminal edge of the section 7 for supporting a retarder and grain guide 46, which retains the cut grain in guiding relation with the conveyor and prevents entanglement of the grain about the conveyor shaft. The retarder 46 is formed of sheet metal bent to an approximately semicylindrical shape to form an inverted trough having one edge 47 attached to the terminal edge of the section 7, and its other edge 48 extending over and in close proximity to the periphery of the conveyor. The retarder is attached to the terminal end of the flange 45, as at 49, to rigidly support the edge 48 in spaced relation with the conveyor. The retarder thus described extends from the outer end wall of the pan to the inlet of the feeding chamber, and connects with an arcuate deflector plate 50, formed as a part of the wind board, and which defines the upper edge of the opening 33. The rear side of the wind board is provided adjacent the inlet of the feeding chamber with a hopper 51 for receiving the tailings from a tailing elevator 52 and for delivering the tailings through an opening 53 in the pan, as in conventional practice.

Attached to and projecting rearwardly from the angle bar 17 is a stiffening plate 54 having a depending flange 55. The rear edge of the plate 54 tapers from the outer end wall of the pan to a point in substantial alignment with the inner edge of the cover plate 32, from where it tapers reversely to connect with the end wall 29 to form a truss-like member, which further strengthens the pan and cooperates with the construction forming the grain retarder to resist sagging of the outer end of the pan when it is mounted on the machine and suspended by a rod 56 that is pivotally connected to a bracket 57 attached to the angle bar 14.

From the foregoing it is obvious that I have provided a grain pan construction that has a substantially high strength weight ratio, and therefore is particularly adapted to small combines where weight is an important factor. The particular construction of the pan forming the grain retarder, in cooperation with the angle plates forming the upper edge of the wind board and the upper edge of the end wall 18, renders the pan especially resistant to torsional strains.

What I claim and desire to secure by Letters Patent is:

1. A harvester pan including a bottom section, an upper section cooperating with a portion of the bottom section to form a wind board, an inverted trough-shaped retarder extending longitudinally of the sections and one side connected with the bottom section, means connecting the retarder with the upper section, and a stiffening plate extending along the upper edge of the wind board and cooperating with the retarder for enhancing the rigidity of the pan.

2. A harvester pan of the character described including a bottom section having a portion forming the lower portion of a wind board extending along the exterior side of the pan, an inverted trough-shaped member having one edge secured to the lower portion of the wind board, and an upper section having a forwardly and downwardly extending wing connected with the other side of said trough-shaped member to connect said sections and form a retarder in the pan.

3. A harvester pan including a bottom section, end walls for the bottom section, an upper section cooperating with a portion of the bottom section to form a wind board, an inverted substantially trough-shaped retarder extending longitudinally of the pan and connecting said sections, a stiffening plate extending along the upper edge of the wind board and cooperating with the retarder for enhancing the rigidity of the pan in the lengthwise direction of the pan, and a forward extension on one of the end walls, said end wall and extension having a rolled upper edge extending entirely thereacross to reinforce the pan in a transverse direction.

4. A harvester pan of the character described including a bottom section having a portion forming the lower portion of a wind board extending along the exterior side of the pan, an inverted trough-shaped member secured to the lower portion of the wind board, an upper section having a forwardly and downwardly extending wing connected with said trough-shaped member to connect said sections and form a retarder in the pan, and spaced supporting members fixed to the exterior of the pan and bridging the trough-shaped member.

5. A harvester pan including a bottom section having an upper edge, an upper section forming a wind board and spaced from the upper edge of the bottom section, an inverted trough-shaped retarder extending longitudinally of the sections and having one side connected with the upper edge of the bottom section, a wing on the lower edge of the upper section overlappingly connected with the retarder, and spaced supporting members fixed to the exterior of the pan and bridging the space between said sections.

6. A harvester pan including a bottom section, an upper section cooperating with a portion of the bottom section to form a wind board, an inverted trough-shaped retarder having one side extending along and fixed to said bottom portion, and a downwardly and forwardly extending wing on the upper section having connection with the trough-shaped retarder at a point spaced from said fixed side of the retarder.

7. A harvester pan including a bottom section, an upper section cooperating with a portion of the bottom section to form a wind board, an inverted trough-shaped retarder having one side extending along and fixed to said bottom portion, a downwardly and forwardly extending wing on the upper section having connection with the trough-shaped retarder at a point spaced from said fixed side of the retarder, and a truss element extending laterally along the upper portion of the wind board to cooperate with the retarder in enhancing rigidity of the pan.

TORVALD N. PIERSON.